(12) United States Patent
Yankun et al.

(10) Patent No.: US 8,903,127 B2
(45) Date of Patent: Dec. 2, 2014

(54) EGOMOTION ESTIMATION SYSTEM AND METHOD

(75) Inventors: Zhang Yankun, Shanghai (CN); Hong Chuyang, Shanghai (CN); Norman Weyrich, Shanghai (CN)

(73) Assignee: Harman International (China) Holdings Co., Ltd., Shanghai (CN)

( * ) Notice: Subject to any disclaimer, the term of this patent is extended or adjusted under 35 U.S.C. 154(b) by 486 days.

(21) Appl. No.: 13/234,482

(22) Filed: Sep. 16, 2011

(65) Prior Publication Data

US 2013/0070962 A1   Mar. 21, 2013

(51) Int. Cl.
*G06K 9/00* (2006.01)
*G06T 7/20* (2006.01)

(52) U.S. Cl.
CPC ......... *G06T 7/20* (2013.01); *G06T 2207/10016* (2013.01); *G06T 2207/20021* (2013.01); *G06T 2207/30256* (2013.01); *G06T 7/2053* (2013.01)
USPC ............................. 382/103; 382/100; 382/153

(58) Field of Classification Search
None
See application file for complete search history.

(56) References Cited

U.S. PATENT DOCUMENTS

| 5,809,161 | A  | * | 9/1998 | Auty et al. ................... 382/104 |
| 6,307,959 | B1 | * | 10/2001 | Mandelbaum et al. ....... 382/154 |
| 6,704,621 | B1 | * | 3/2004 | Stein et al. ..................... 701/1 |
| 7,148,913 | B2 | * | 12/2006 | Keaton et al. ................. 348/169 |
| 7,260,274 | B2 | * | 8/2007 | Sawhney et al. ............. 382/284 |
| 7,551,067 | B2 |   | 6/2009 | Otsuka et al. |
| 7,778,466 | B1 | * | 8/2010 | Medasani et al. ............ 382/199 |
| 8,395,659 | B2 | * | 3/2013 | Nishigaki ..................... 348/48 |
| 2010/0053322 | A1 |   | 3/2010 | Marti et al. |
| 2010/0053324 | A1 |   | 3/2010 | Kim et al. |

OTHER PUBLICATIONS

Stein, et al.; A Robust Method for Computing Vehicle Egomotion;7pp.
Miksch, et al.; Motion Compensation for Obstacle Detection Based on Homography and Odometric Data with Virtual Camera Perspectives; 7pp.
Yamaguchi, et al.; Ego-Motion Estimation using a Vehicle Mounted Monocular Camera; Extended Summary; EEJ Transactions on Electronics, Information and Systems, vol. 129, Issue 12, pp, 2213-2221 (2009); 1 pg.

* cited by examiner

*Primary Examiner* — Avinash J Yentrapati
(74) *Attorney, Agent, or Firm* — Alleman Hall McCoy Russell & Tuttle LLP

(57) ABSTRACT

A computer-implemented method for determining an egomotion parameter using an egomotion estimation system is provided. First and second image frames are obtained. A first portion of the first image frame and a second portion of the second image frame are selected to respectively obtain a first sub-image and a second sub-image. A transformation is performed on each of the first sub-image and the second sub-image to respectively obtain a first perspective image and a second perspective image. The second perspective image is iteratively adjusted to obtain multiple adjusted perspective images. Multiple difference values are determined that respectively correspond to the respective difference between the first perspective image and the adjusted perspective images. A translation vector for an ego motion parameter is determined. The translation vector corresponds to one of the multiple difference values.

22 Claims, 5 Drawing Sheets

EGOMOTION ESTIMATION SYSTEM AND METHOD

FIELD OF THE INVENTION

This invention relates to egomotion and more particularly to estimating a motion parameter for a camera.

BACKGROUND

Egomotion refers to the three-dimensional movement of a camera within an environment. Egomotion estimation refers to estimating the movement of the camera within an environment based on a series of images captured by the camera. Egomotion estimation is an important task in the field of computer vision and in particular to understanding and reconstructing three-dimensional scenes. Scene understanding and reconstruction are important to computer vision-based operation of mobile machines such as, for example, vehicles and self-guided robots.

In order to understand or reconstruct a scene, computer vision techniques may be employed to segment image frames of the scene. Image segmentation, however, may be a difficult task when the camera is moving. Image segmentation techniques must take into account the movement of the camera, which may be achieved by estimating egomotion as a preliminary step.

One known egomotion estimate approach recognizes, tracks, and matches feature points in a series of image frames. Feature tracking, however, may be computationally expensive to process.

Another known egomotion estimation approach relies on landmarks in the image frame such as, for example, lane markers or text on the road surface. In practice, however, prominent landmarks on the road surface may not always be available.

An additional technique for estimating egomotion uses stereo vision. This technique uses at least two cameras to obtain image frames of the environment. As a result, the stereo vision approach increases the hardware costs of egomotion estimation.

A need exists for an accurate, fast, and computationally inexpensive approach for estimating egomotion.

SUMMARY

A computer-implemented method for determining an egomotion parameter using an egomotion estimation system is provided. First and second image frames are obtained. A first portion of the first image frame and a second portion of the second image frame are selected to respectively obtain a first sub-image and a second sub-image. A transformation is performed on each of the first sub-image and the second sub-image to respectively obtain a first perspective image and a second perspective image. The second perspective image is iteratively adjusted to obtain multiple adjusted perspective images. Multiple difference values are determined that respectively correspond to the respective difference between the first perspective image and the adjusted perspective images. A translation vector for an ego motion parameter is determined. The translation vector corresponds to one of the multiple difference values.

A system for determining an egomotion parameter is also provided. An image processing module receives a first image frame and a second image frame. An image segmentation module selects a portion of the first image frame and a portion of the second image frame to respectively obtain a first sub-image and a second sub-image. An image transformation module performs respective transformations on the first sub-image and the second sub-image to respectively obtain a first perspective image and a second perspective image. A motion compensation module adjusts the second perspective image to obtain an adjusted perspective image. An image difference module determines a difference value corresponding to the difference between the first perspective image and the adjusted perspective image. An egomotion parameter determination module iteratively obtains a plurality of difference values respectively corresponding to the respective difference between the first perspective image and multiple adjusted perspective images. The egomotion parameter determination module also determines a translation vector for an egomotion parameter. The translation vector corresponds to one of the multiple difference values.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

The system and method described may be used to determine an egomotion parameter for a camera. The system and method will be described by way of example in the context of a camera mounted to a vehicle, the camera capturing image frames that depict the path of movement of the vehicle. It will be understood, however, that the teachings in this application may be applied to any camera-equipped mobile machine moving at relatively slow speeds (e.g., vehicles, mobile robots, etc.). In the example shown, the relatively slow speeds of movement may be around 10-20 kilometers per hour (km/h) or around 6.2-12.4 miles per hour (mph).

The egomotion parameter refers to the distance and direction of travel of the camera, i.e., how far and in what direction along a horizontal and vertical path of movement. The horizontal and vertical path of movement may respectively correspond to an x-axis and a y-axis. Accordingly, the egomotion parameter, in this example, includes a translation vector, $(t_x, t_y)$, that include a horizontal component, $t_x$, and a vertical component, $t_y$. The horizontal component, $t_x$, and vertical component, $t_y$, respectively define the translation (in image pixels) along the horizontal x-axis and the vertical y-axis. The egomotion parameter may also include an angle of rotation, $\theta$. The egomotion parameter may be estimated as a preliminary step in computer vision applications such as, for example, camera-assisted vehicle navigation (e.g., parking, backing up, obstacle detection), self-guided robot navigation, pose estimation, and three-dimensional scene reconstruction.

In general, and as discussed in further detail below, the egomotion estimation system operates by comparing the differences between image frames captured by the camera. For a camera-equipped vehicle, for example, the egomotion estimation system compares the differences between two image frames in a series of image frames that depict the path of the vehicle in order to determine a motion parameter. The egomotion estimate system, in this example, processes the images using relatively simple arithmetic operations—in particular, addition and subtraction—which advantageously makes the system suitable for implementation using specialized hardware such as, for example, graphical processing units (GPUs) and field programmable gate arrays (FPGAs). In implementations that use specialized hardware such as these, processing the images to determine the motion parameter may be relatively fast.

Figure 1:
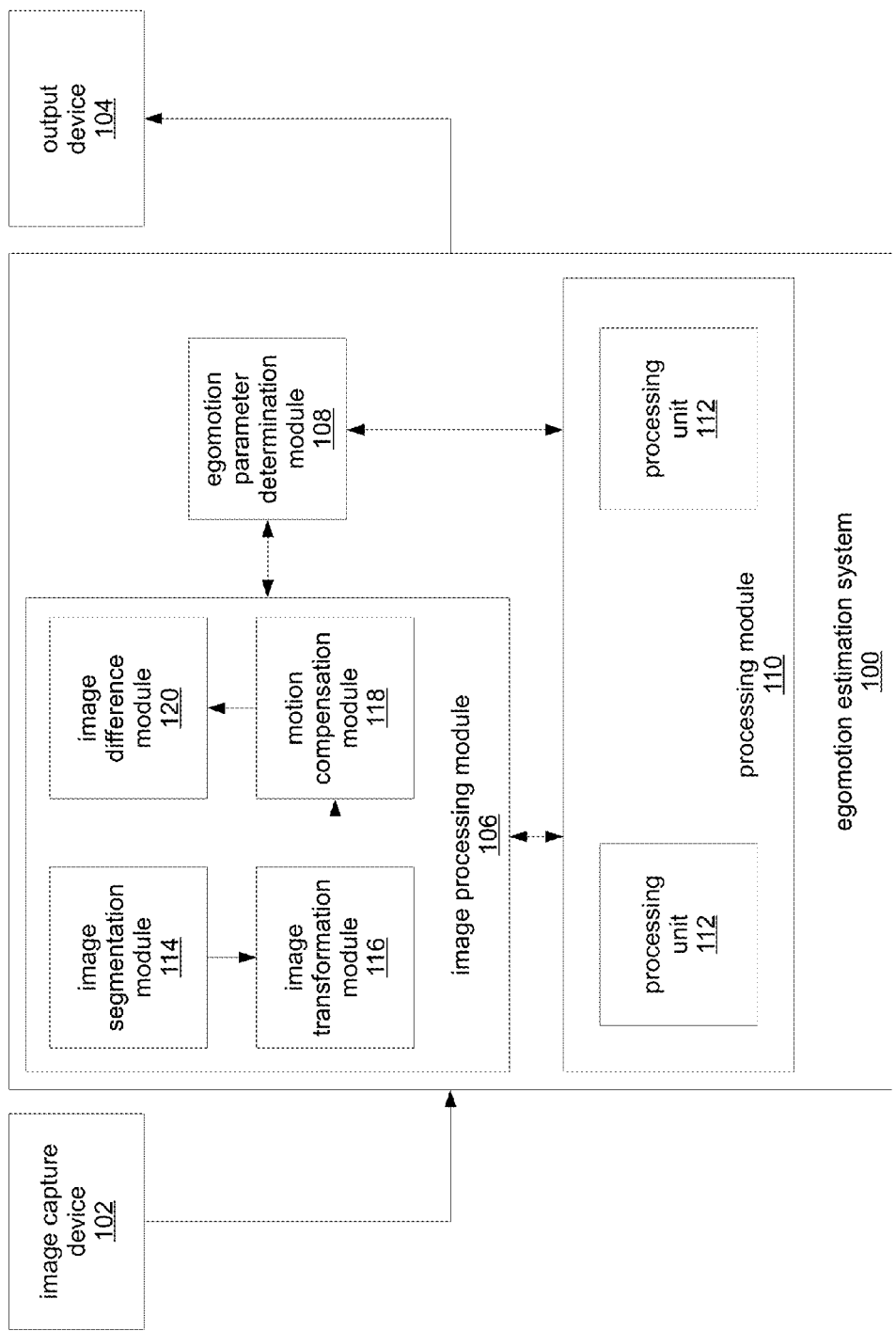
FIG. 1 is an example of an implementation of an egomotion estimation system.

Referring to FIG. 1, an example of an implementation of an egomotion estimation system 100 is shown. The egomotion estimation system 100 in the example shown is in signal communication with an image capture device 102 and an output device 104. The image capture device 102 may transmit the image frames to the egomotion estimation system 100 for processing in order to determine the egomotion parameter. The output device 104 may be, for example, a display device that displays the egomotion parameter to a user or alternatively, another system that uses the egomotion parameter in some application (e.g., a drive control system that uses the egomotion parameter for controlled operation of a mobile machine).

The egomotion estimation system 100 may process a pair of image frames captured by the image capture device 102 to determine the motion parameter. The image capture device 102 may capture the image frames at a predetermined frame rate, e.g., 30 frames per second (fps). At 30 fps, the time interval between consecutive image frames is around 0.06 seconds (s): 2 frames÷30 frames per second≈0.06 s. Because the egomotion estimation system 100 in this example determines an egomotion parameter for a image capture device 102 moving at relatively slow speeds (10-20 km/h), the egomotion estimation system may assume a predetermined maximum speed for the mobile machine such as, for example, a maximum speed of 20 km/h. Based on the assumed maximum speed and the time between image frames, the egomotion estimation system 100 may determine a maximum distance (in pixels) the mobile machine may travel between consecutive image frames.

For example, if the image capture devices 102 operates at 30 fps resulting in around 0.06 s between consecutive image frames, and the maximum speed is assumed to be 20 km/h, then a maximum distance the mobile machine may travel between consecutive image frames is around 0.3333 meters (m): (20 km/h÷3600 s)×0.06 s×1000 m≈0.3333 m.

In some implementations, the egomotion estimation system 100 does not process every image frame, and the frames selected for processing may depend on a predetermined image frame interval. For example, if the image frame interval is set to 10, then the egomotion estimation system 100 may select image frames [1, 10, 20, 30, . . . ] for processing with image frames [1, 10] selected as the first pair, image frames [10, 20] selected as the second pair, etc. Other image frame intervals may be selectively employed.

Accordingly, the egomotion estimation system 100 may determine a maximum distance the image capture device 102 may travel between a one selected image frame and the subsequently selected image frame based on the frame interval and the maximum distance between consecutive image frames. Using the example above—image frame interval set to 10 captured at 30 fps with an assumed maximum speed of 20 km/h—the maximum distance between the selected image frames is around 3.333 m: 10×0.3333 m≈3.333 m. The maximum distance between the image frame pair may thus correspond to a maximum translation vector, $(T_x, T_y)$, which includes a maximum horizontal component, $T_x$, and a maximum vertical component, $T_y$. The maximum horizontal and vertical components, $T_x$ and $T_y$, represent the maximum distance (in pixels) the mobile machine may respectively travel along the horizontal and vertical axes between the selected image frames. The egomotion estimation system 100, in this example, relies on the maximum translation vector to determine the egomotion parameter as explained in further detail below.

The egomotion estimation system 100 shown in FIG. 1 includes various modules for determining the egomotion parameter including: an image processing module 106 for processing the image frames receives from the image capture device, an egomotion parameter determination module 108 for determining the egomotion parameter based on the processed images, and a processing module 110 having one or more processing units 112 for executing instructions relating to processing the image frames and determining the egomotion parameter. The egomotion estimation system 100 of FIG. 1 may also include other supplemental hardware (not shown) such as, for example, a memory unit for storing the image frames and data related to the egomotion parameter.

The image processing module 106, in this example, includes various modules for processing the image frames received from the image capture device. In this example, the image processing module 106 includes: an image segmentation module 114 for segmenting the images frames into respective sub-images; an image transformation module 116 for performing projective transformations on the sub-images and obtaining perspective images; a motion compensation module 118 for performing geometric translations on the perspective images to compensate for the movement of the image capture device; and an image difference module 120 for calculating the difference between the perspective images.

Figure 2:
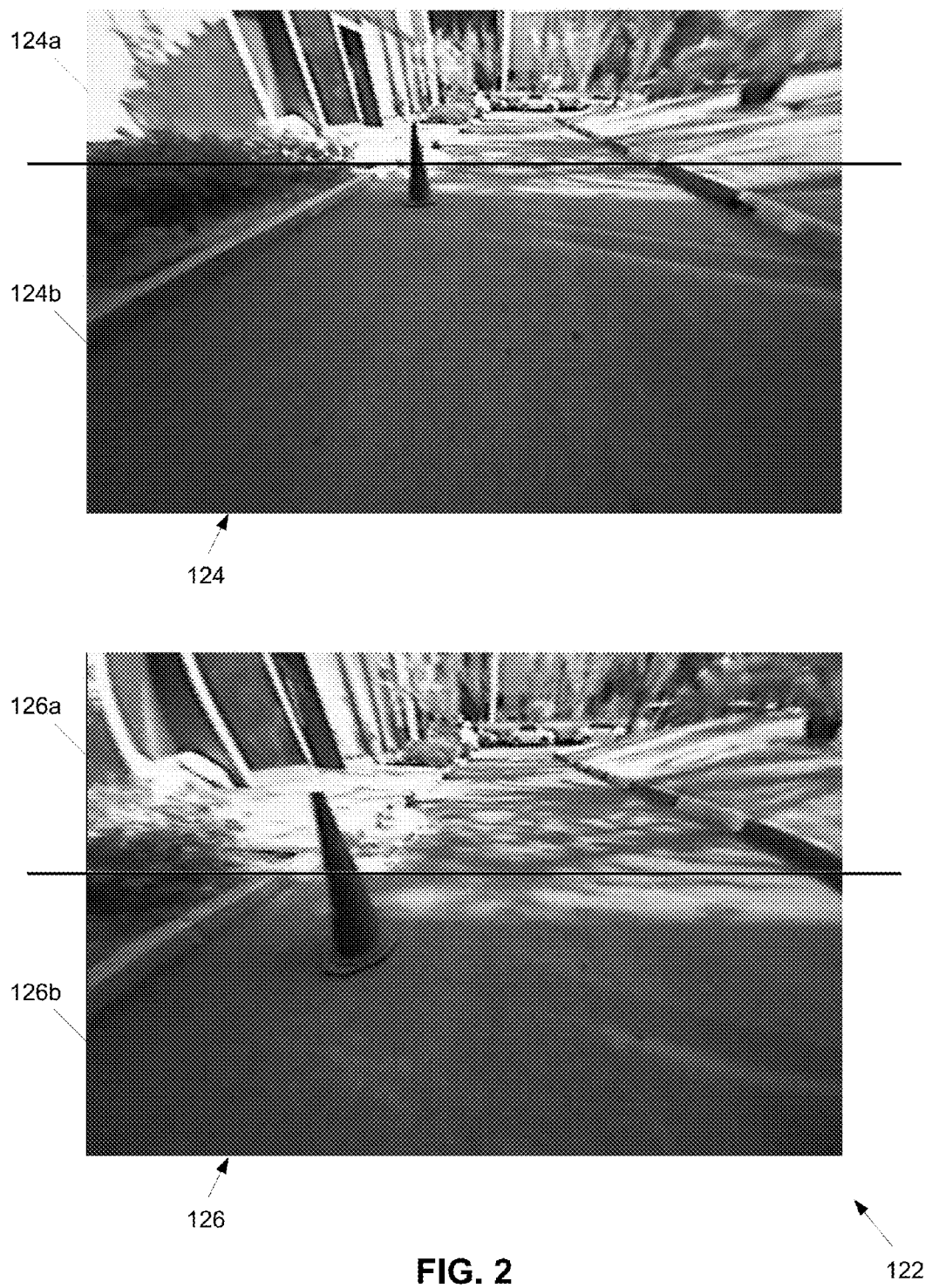
FIG. 2 is an example of an image frame pair.

The image processing module 106 processes a pair of selected image frames. Based on an analysis of the image frames, the egomotion estimation system 100 may determine an egomotion parameter. FIG. 2 shows an example of a selected image frame pair 122. The two selected image frames 124 and 126 depict the path of movement of a vehicle equipped with an image capture device 102. The image capture device 102 captured the example image frames 124 and 126 shown in FIG. 2 while the vehicle was moving. Because the vehicle was moving while the image frames 124 and 126 were captured, the objects in the subsequent image frame 126 are slightly displaced relative to their position in the previous image frame 124. The egomotion estimation system 100, in this example, relies on the displacement objects between image frames when determining the egomotion parameter as discussed in further detail below.

The image segmentation module 114 in FIG. 1 segments (or divides) the image frames. The image segmentation module 114 then selects a portion of each image frame as a sub-image. For example, the image segmentation module 114 may divide an image frame into an upper sub-image 124a and 126a and a lower sub-image 124b and 126b as shown by way of example in FIG. 2. In this example, the sub-image having the most road surface is designated as the sub-image of interest, and subsequent image processing is performed on the sub-images of interest. Typically, the lower sub-image will include the most road surface and will be designated as the sub-image of interest. As seen in FIG. 2, the example image frames 124 and 126 have been divided into respective upper sub-images 124a and 126a and lower sub-images 124b and 126b and each lower sub-image include the most road surface. Accordingly, the lower sub-images 124b and 126b in this example may be selected as the sub-images of interest.

Figure 3:
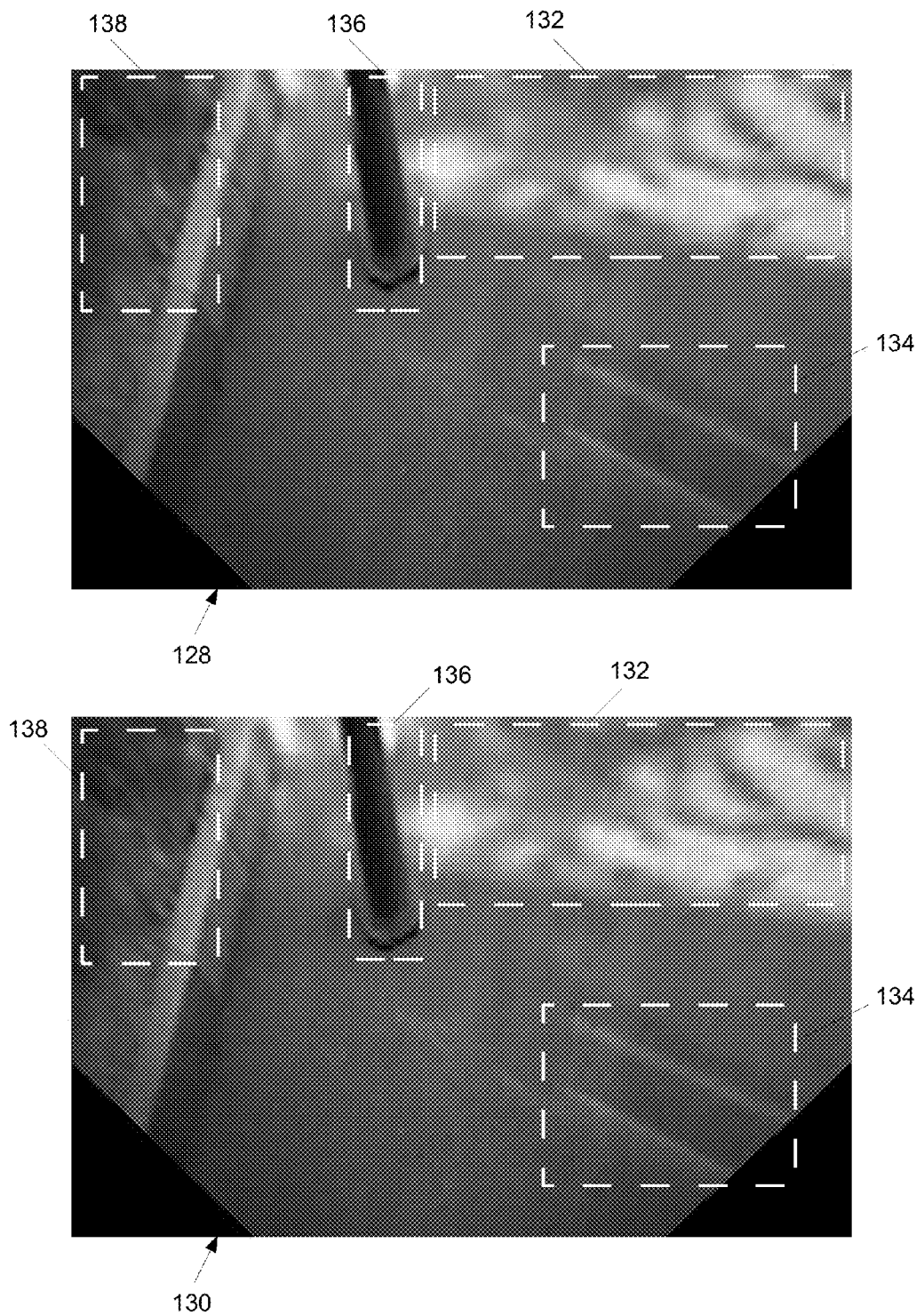
FIG. 3 are respective top-view perspective images for the example image frame pair of FIG. 2.

The image transformation module 116 performs a perspective transformation on each of the sub-images of interest. The perspective transformation results in respective top-view perspective images for each of the sub-images of interest 124 and 126. Referring to FIG. 3, two top-view perspective images 128 and 130 are shown that respectively correspond to the sub-images of interest 124b and 126b shown in FIG. 2.

According to homography theory, the perspective transformation will deform some, but not all, of the objects in the top-view perspective image. For example, the perspective transformation may not deform objects that are coplanar with the road surface (e.g., lane markers, paint strips, text, shadows, lighting, etc.). Objects coplanar with the road surface in the top-view perspective images of FIG. 3 include the shadows 132 and the light rays 134. In contrast, the perspective transformation may deform objects that are not coplanar, i.e., objects that are perpendicular to and rise up from the road surface (e.g., pillars, poles, traffic cones, trees, people, etc.). Non-coplanar objects in the top-view perspective images of FIG. 3 include the traffic cone 136 and the bushes 138 on the side of the road. Objects that rise up from the road surface may be, for example, elongated as a result of the perspective transformation. Furthermore, because of the camera movement, the perspective transformation may result in varying degrees of deformation for the non-coplanar objects. The egomotion estimation system 100 additionally relies on these homographic phenomena when determining the egomotion parameter as discussed in further detail below.

The egomotion estimation system 100 in FIG. 1 also includes an image difference module 120 that calculates the difference between the top-view perspective images. In this example, the perspective images are raster images and are accordingly composed of a grid of pixels, each pixel having a corresponding pixel value. A difference image refers to an image that results from respectively subtracting each of the pixel values, e.g., a red-green-blue (RGB) value, in one image from the corresponding pixel values in another image. The values for the pixels in the difference image may thus be the difference between corresponding pixels of the two images. If the pixel values for the corresponding pixels are the same, then the resulting difference between the pixel values is zero, which may be represented in the difference image as a black pixel. Therefore, if two images are identical, then the resulting difference image will be completely black since each respective pixel value in the two images are the same resulting in difference values of zero. If the two images are slightly different, however, the difference image may include some non-black pixels since the difference between corresponding pixels in the two images is non-zero. When there are non-zero differences between corresponding pixel values, the difference image may include artifacts as non-black pixels.

Figure 4:
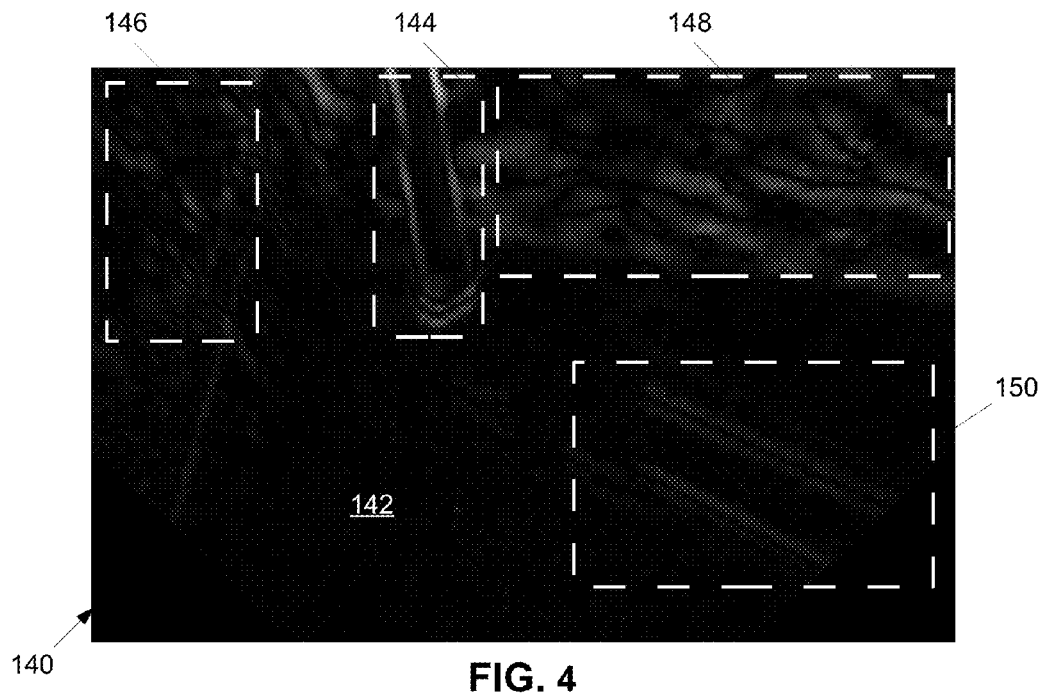
FIG. 4 is a difference image for the top-view perspective images of FIG. 3 where motion compensation has not been performed.

In this example, the selected image frames captured by the image capture device may be slightly different due to the motion of the image capture device. As mentioned above, some of the objects in the subsequent image frames will be displaced. As a result, a difference image for the selected image frames may include artifacts as non-black pixels. In FIG. 4, a difference image 140 for the top-view perspective images 128 and 130 of FIG. 3 is shown. As seen in FIG. 4, much of the road surface 142 appears black in the difference image 140. Other objects in the image frames 128 and 130 of FIG. 3 result in artifacts (e.g., grayish pixels) in the difference image of FIG. 4 due to the displacement of the objects in the subsequent image frame. The difference image 140, in this example, includes artifacts for both coplanar and non-coplanar objects including: the traffic cone 144 in the road, the bushes 146 on the side of the road, the shadows 148 on the road surface, and the light rays 150 on the road surface.

The difference between images may also be quantified as a single value, $Img_{diff}$. The difference between two images may be quantified as the sum of the absolute difference between the RGB values of corresponding pixels in the image. The absolute difference between pixels for two images, Image A and Image B, may be calculated as follows:

$$Px_{diff} = |R_A - R_B| + |G_A - G_B| + |B_A - B_B| \quad (1)$$

where $R_A$ and $R_B$ are the red components of corresponding pixels in Image A and Image B respectively; $G_A$ and $G_B$ are the green components of corresponding pixels in Image A and Image B respectively; and $B_A$ and $B_B$ are the blue components of corresponding pixels in Image A and Image B respectively.

The absolute difference between each pixel value, $Px_{diff}$, may be summed to obtain an overall difference value, $Img_{diff}$, for the difference image. Accordingly, the overall value for the difference image between two images, Image A and Image B, may be calculated as follows:

$$Img_{diff} = \Sigma Px_{diff} \quad (2)$$

The egomotion estimation system 100, in this example, may reduce the amount of difference between the top-view perspective images—and therefore reduce the $Img_{diff}$ value—by compensating for the movement of the image capture device between image frames such that objects in the image frames (and their corresponding pixels) are aligned. Compensating for the motion of the image capture device and aligning objects reduces the amount of artifacts in the difference image for the top-view perspective images and therefore reduces the difference value, $Img_{diff}$, which quantifies the differences between the images.

The egomotion estimation system 100 in this example includes a motion compensation module 118 that adjusts the top-view perspective images in order to compensate for the movement of the image capture device and align objects in the top-view perspective images. The motion compensation module 118, in this example, uses a pixel translation vector, (p, q). In this example p is a horizontal translation value that defines a translation in the horizontal direction (x-axis) and q is a vertical translation value that defines a translation in the vertical direction (y-axis). Using the pixel translation vector, (p, q), the motion compensation module 118 may translate the pixels in one of the top-view perspective images p number of pixels in the horizontal direction and q number of pixels in the vertical direction. The translation of pixels in one of the top-view perspective images may align some of the objects in the top-view perspective image with the objects in the corresponding top-view perspective image—in particular, objects coplanar with the road surface. Compensating for the motion of the image capture device and aligning some of the objects in the top-view perspective images may cause aligned objects to turn black in the difference image as discussed above—i.e., the difference between some of the corresponding pixels may be zero, and some artifacts may not result.

Figure 5:
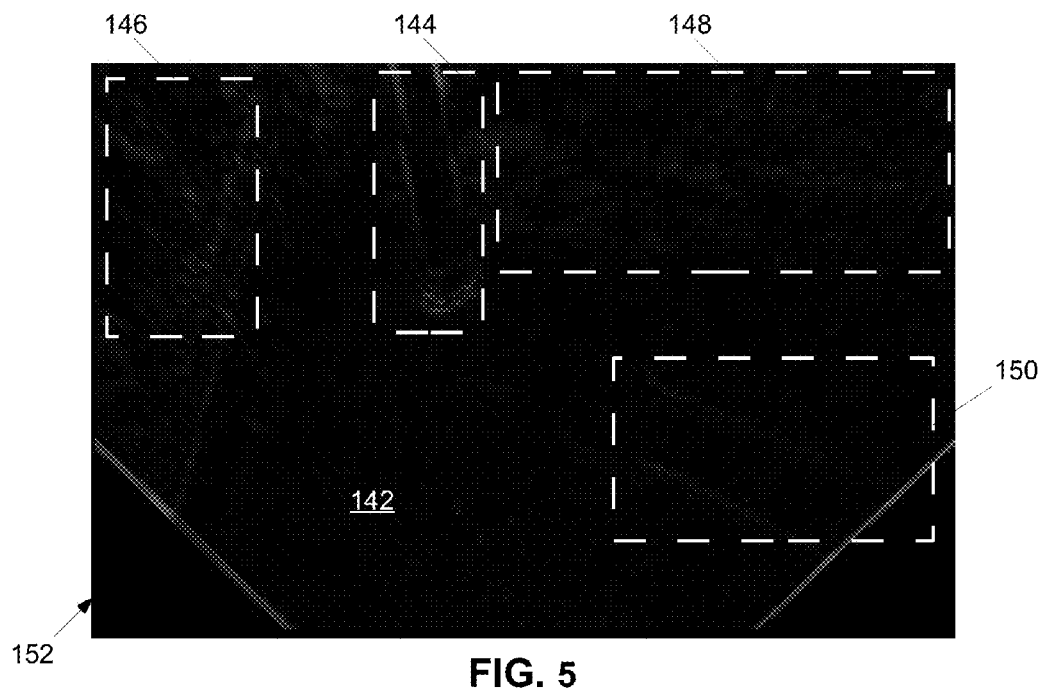
FIG. 5 is a difference image for the top-view perspective images of FIG. 3 where motion compensation has been performed.

As mentioned above, some of the objects in the top-view perspective images—in particular the non-coplanar objects that rise up from the road surface—may not exactly align due to the different degrees of deformation the objects undergo as a result of the perspective transformation. Referring to FIG. 5, a difference image 152 for the top-view perspective images is shown where motion compensation has been performed. As seen in FIG. 5, artifacts for the traffic cone 144 and artifacts for the bushes 146 (both non-coplanar objects) remain in the difference image even after motion compensation. Objects coplanar with the road surface, however, turn black like the rest of the road surface and are not seen in the difference image that includes motion compensation. In particular, much of the shadows 148 and the light rays 150 seen in the difference image 140 of FIG. 4 without motion compensation turn black (and blend into the black-colored road surface 142) in the difference image 152 shown in FIG. 5 with motion compensation. Thus, a comparison of the difference image 140 without motion compensation in FIG. 4 to the difference image 152 with motion compensation in FIG. 5 illustrates that motion compensation can minimize the differences between the image; the difference image 152 with motion compensation includes fewer artifacts than the difference image 140 without motion compensation and, as a result, will have a smaller overall difference value, $Img_{diff}$. Accordingly, the motion compensation module 118 can minimize the difference value, $Img_{diff}$, by compensating for the motion of the image capture device 102.

It thus follows that there exists some combination of values for the pixel translation vector, (p, q), that results in a minimal overall difference value, $Img_{diff}$. In other words, there exists some pixel translation vector that minimizes the artifacts in a difference image for a set of top-view perspective images that respectively correspond to a set of image frames. The values for the pixel translation vector, (p, q), that corresponds to a minimal difference value, $Img_{diff}$, may be identified as the pixel translation vector ($t_x$, $t_y$) that corresponds to the physical distance actually traveled by the image capture device between the image frames. The physical distance corresponding to the translation vector, ($t_x$, $t_y$), may be determined using the intrinsic parameters of the camera (e.g., the focal length, image sensor format, and principal point).

Therefore, in order to determine which respective values for the pixel translation vector, (p, q), result in the minimal difference value, $Img_{diff}$, the egomotion estimation system 100 considers values for p and q up to the respective maximum pixel translations, $T_x$ and $T_y$, which represent the maximum distance the vehicle could have traveled between the image frames.

In essence, the egomotion estimation system 100, in this example, uses a brute force-like approach to identify the values for the translation vector, ($t_x$, $t_y$), by: iteratively translating the pixels in one of the top-view perspective images using incremental values for p and q up to the maximum pixel distance, ($T_x$, $T_y$), in order to compensate for the distance the image capture device could have traveled between the image frames; determine an $Img_{diff}$ value for each pixel translation vector (p, q); and determine which pixel translation vector, (p, q), corresponds to the minimum $Img_{diff}$ value. The pixel translation vector, (p, q), that corresponds to the minimal $Img_{diff}$ value may be identified as the translation vector, ($t_x$, $t_y$), that corresponds to the physical distance the image capture device actually did travel between the image frames, which can be used in conjunction with the intrinsic parameters of the camera to calculate the real, physical distance the image capture device traveled.

As seen in FIG. 1, the egomotion estimation system 100, in this example, includes an egomotion parameter determination module 108 that determines the egomotion parameter. The egomotion parameter determination module 108 iterates over the values for the pixel translation vector, (p, q), as mentioned above and uses the motion compensation module 118 and the image difference module 120 to identify which particular pixel translation vector minimizes the difference value, $Img_{diff}$, for the top-view perspective images.

In one implementation the egomotion parameter determination module 108 may, for example, pair each value of p in the interval of $[-T_x, T_x]$ with each value of q in the interval of $[0, T_y]$. This example implementation may be characterized by the following nested loop:

$$\text{for } (p = -T_x; p \le T_x; p++)$$
$$\text{for } (q = 0; q \le T_y; q++)$$
$$\text{argmin } Img_{diff}$$

In another example implementation, however, the egomotion parameter determination module 108 may use parallel processing to improve the efficiency and processing time for identifying the values of the pixel translation vector, (p, q), that corresponds to the minimal image difference value, $Img_{diff}$.

In this alternative example implementation, the egomotion parameter determination module 108 may iterate in parallel over each of the values, p and q, of the pixel translation vector. Each iteration may be processed, for example, by a separate processing unit 112 in order to perform the processing in parallel.

For the first iteration, the egomotion parameter determination module 108 sets the value of q to zero and iteratively increments p over the interval of $[-T_x, T_x]$ to determine a respective $Img_{diff}$ value for each pixel translation vector, (p, q=0). The value for p that corresponds to the minimal $Img_{diff}$ value is the value that corresponds to the horizontal component, $t_x$, of the motion parameter. This first iteration for the parallel processing approach in this example may be characterized by the following loop:

$$\text{for } (p = -T_x, q = 0; p \le T_x; p++)$$
$$\text{argmin } Img_{diff}$$

In the second iteration, the egomotion parameter determination module 108 sets the value of p to zero and iteratively increments q over the interval of $[0, T_y]$ to determine a respective $Img_{diff}$ value for each pixel translation vector, (p=0, q). The value for q that corresponds to the minimal $Img_{diff}$ value is the value that corresponds to the vertical component, $t_y$, of the motion parameter. This second iteration for the parallel processing approach in this example may be characterized by the following loop:

$$\text{for } (p = 0, q = 0; q \le T_y; q++)$$
$$\text{argmin } Img_{diff}$$

As seen in these examples, the egomotion parameter determination module 108 iterates p over the interval of $[-T_x, T_x]$ and iterates q over $[0, T_y]$. This is due to the frame of reference for the image frames (124 and 126 in FIG. 2) and the potential movement of the image capture device 102. As mentioned above, the image capture device 102 may be mounted to a mobile machine and capture images that depict the path of travel for the mobile machine. If an x-y axis is plotted relative to the image frame, it can be seen that movement of the mobile machine to the left or to the right will result in a corresponding movement of the image frame to the left or the right along the horizontal axis. In other words there are two directions of travel along the horizontal axis. Therefore, when considering the maximum distance traveled, the mobile machine may maximally travel to the left ($-T_x$) or the right ($T_x$). Thus, the egomotion parameter determination module 108, in this example, searches for the pixel translation vector, (p, q), that minimizes the difference value, $Img_{diff}$, in both the left and right horizontal directions, i.e., in the interval of [$-T_x$, $T_x$]. In contrast, when the mobile machine moves along the path there is only one direction of travel, either forward or backward. Accordingly, the egomotion parameter determination module 108 only searches for the pixel translation vector, (p, q), that minimizes the difference value, $Img_{diff}$, in one direction along the vertical direction, i.e., in the interval of [0, $T_y$].

Each iteration may be processed in parallel at respective individual processing units as seen in FIG. 1. Further, as seen in equations (1) and (2) above, the image difference module 120 and egomotion parameter determination module 108, in this example, uses addition and subtraction operations to compute the difference values, $Img_{diff}$. As a result, computation of the $Img_{diff}$ values may be performed using specialized hardware designed for relatively fast addition and subtraction operations such as, for example, GPUs and FPGAs.

Having obtained the translation vector, ($t_x$, $t_y$), for the egomotion parameter, the egomotion parameter determination module 108 may also determine an angle of rotation, θ, that results from the movement of the image capture device 102. In this example, the egomotion parameter determination system may determine the angle of rotation, θ, using the arctan inverse trigonometric function:

$$\theta = \tan^{-1}\left(\frac{t_y}{t_x}\right) \quad (3)$$

In this way, the egomotion estimation system 100 may generate an egomotion parameter that includes a translation vector, ($t_x$, $t_y$), and a rotation angle, θ, that describes the movement of the image capture device 102. The motion parameter may subsequently be used in various applications such as, for example, camera-assisted vehicle navigation (e.g., parking, backing up, obstacle detection), self-guided robot navigation, pose estimation, and three-dimensional scene reconstruction.

Figure 6:
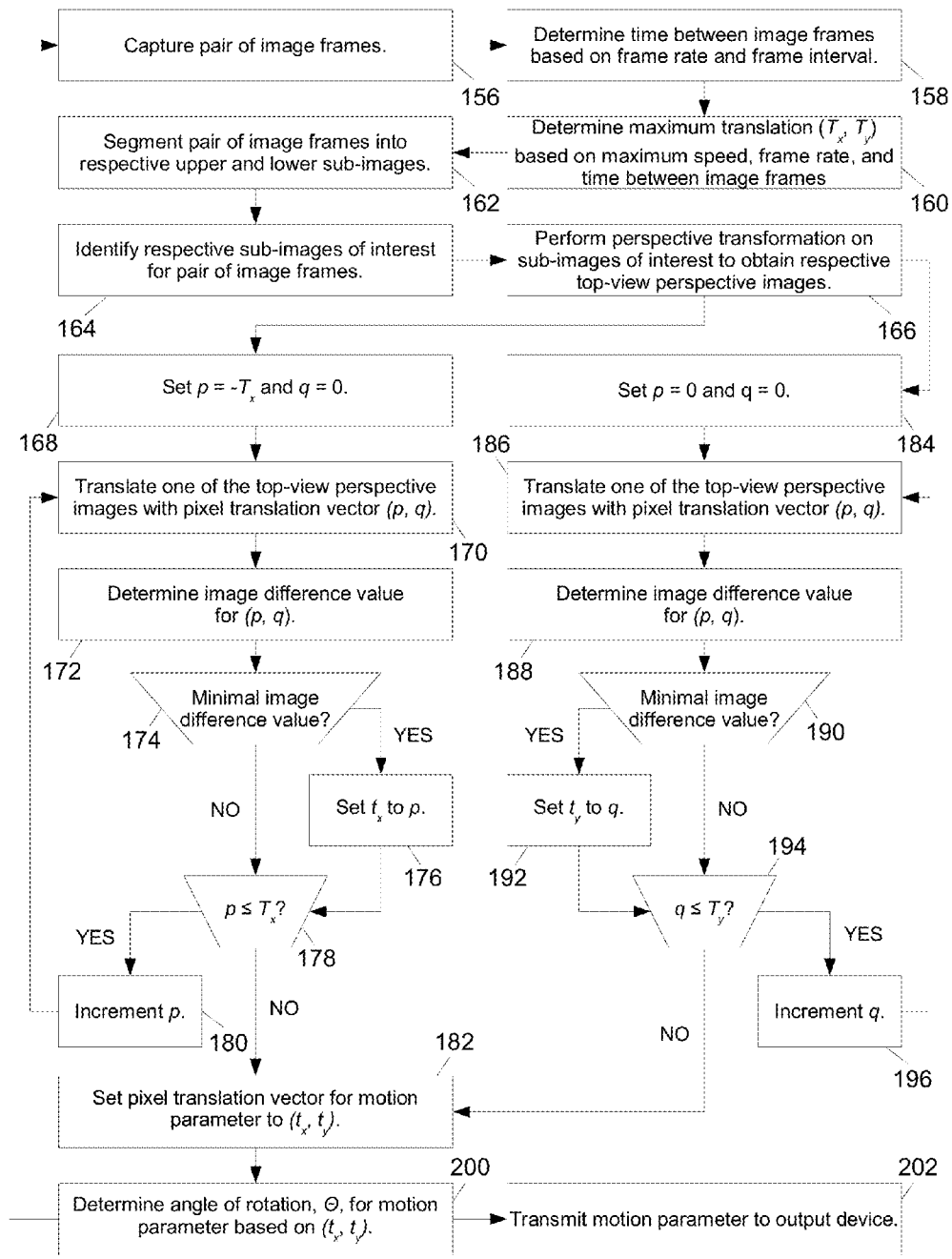
FIG. 6 is a flowchart of example method steps for determining an egomotion parameter.

Referring now to FIG. 6, a flowchart 154 of example method steps for determining an egomotion parameter is shown. First, an image capture device captures a pair of image frames (step 156). As discussed above, an image frame interval may determine which image frames are selected for processing (e.g., an image frame interval of 10). Based on the image frame rate (e.g., 30 fps) and image frame interval (e.g., 10), the time interval between the selected image frames is determined (step 158). For example, at 30 fps (0.06 s between consecutive image frames) and a frame interval of 10, the time interval between selected image frames is around 0.6 s (0.06 s×10≈0.6 s). Based on the time interval between the selected image frames and an assumed maximum speed (e.g. 20 km/h), a maximum distance the image capture device may travel between the selected image frames is determined (step 160). For example, at an assumed maximum speed of 20 km/h and a time interval of 0.6 s between selected image frames, the maximum distance is around 3.333 m (0.6 s×20 km/h≈3.333 m). The horizontal and vertical components of the maximum translation vector, ($T_x$, $T_y$), may be set to values corresponding to the maximum distance.

The selected image frames may then be segmented into respective upper sub-images and lower sub-images (step 162). Then the respective sub-images of interest in each image frame are identified (step 164). As discussed above, the sub-images of interest are the sub-images having the most road surface, which are typically the lower sub-images of the image frames. The sub-images of interest are further processed to determine the motion parameter.

A perspective transformation is performed on each sub-image to obtain respective top-view perspective images (step 166). Once the top-view perspective images have been obtained, an iterative search may be performed to determine which values for p and q of a pixel translation vector, (p, q), may be used to translate the pixels in one of the top-view perspective images such that a difference value between the top-view perspective images is minimized.

As discussed above, a nested iteration may be employed such that each value of p in the interval of [$-T_x$, $T_x$], are paired with each value of q in the interval of [0, $T_y$]. An alternative approach that may be relatively less time-consuming or computationally expensive may be optionally employed as well. The example steps shown in FIG. 6 illustrate an alternative approach where each iteration is processed in parallel to improve the efficiency and reduce the time needed to determine the values for the pixel translation vector, (p, q), that results in a minimal image difference value. In FIG. 3, steps 168-180 to determine the value for p and steps 184-196 to determine the value for q may be processed in parallel at, for example, individual processing units.

The first iteration (steps 168-180) that may be processed in parallel starts by setting p=$-T_x$ and setting q=0 (step 168). The pixels in one of the top-view perspective images are then translated using the pixel translation vector (p, q) (step 170). As mentioned above, translating the pixels in one of the top-view perspective images may align some of the objects in the top-view perspective images. Based on the values for p and q, however, some of the objects may be more or less aligned. As a result, the resulting difference image may include more or less artifacts, and the image difference value will be higher or lower depending on the degree of the alignment of the objects. In this example parallel processing approach, the value for p that results in the smallest image difference value is the value that corresponds to the correct horizontal component, $t_x$, of the translation vector, ($t_x$, $t_y$), of the motion parameter.

After, one of the top-view perspective images has been translated using the pixel translation vector, (p, q), a difference value for the top-view perspective images is then determined according to equation (1) and equation (2) above (step 172). If the difference value for the current pixel translation vector, (p, q), is the minimal image difference value (step 174), then $t_x$ is set to p (step 176). If the image difference value is not the minimal image difference value then the iteration moves on to the next value for p. As mentioned above, the first iteration in this example considers values for p in the interval of [$-T_x$, $T_x$], where $T_x$ is the maximum distance in pixels the image capture device could have moved between the selected image frames. Therefore, it is determined if the value for p is less than or equal to $T_x$ (step 178). If p is less than the value of $T_x$, then the value for p is incremented (step 180) and steps 170-178 may be repeated to determine if the incremented value for p results in a smaller image difference value. If p is not less than the value of $T_x$, then the value for $t_x$ set during the iteration may be set as the horizontal component of the translation vector, $(t_x, t_y)$, for the motion parameter (step 182).

The second iteration (steps 184-196) that may be processed in parallel starts by setting p=0 and setting q=$T_y$ (step 184). The pixels in one of the top-view perspective images are then translated (step 186) using the pixel translation vector (p, q). In this example parallel processing approach, the value for q that results in the smallest image difference value is the value that corresponds to the correct vertical component, $t_y$, of the translation vector, $(t_x, t_y)$, of the motion parameter.

After, one of the top-view perspective images has been translated using the pixel translation vector, (p, q), a difference value for the top-view perspective images is then determined according to equation (1) and equation (2) above (step 188). If the difference value for the current pixel translation vector, (p, q), is the minimal image difference value (step 190), then $t_y$ is set to q (step 192). If the image difference value is not the minimal image difference value then the iteration moves on to the next value for q. As mentioned above, the first iteration in this example considers values for q in the interval of [0, $T_y$], where $T_y$ is the maximum distance in pixels the image capture device could have moved between the selected image frames. Therefore, it is determined if the value for q is less than or equal to $T_y$ (step 194). If q is less than the value of $T_y$, then the value for q is incremented (step 196) and steps 186-194 may be repeated to determine if the incremented value for q results in a smaller image difference value. If q is not less than the value of $T_y$, then the value for $t_y$ set during the iteration may be set as the vertical component of the translation vector, $(t_x, t_y)$, for the motion parameter (step 182).

Once the translation vector, $(t_x, t_y)$, for the motion parameter has been determined, the angle of rotation, θ, for the motion parameter may be determined using the arctan inverse trigonometric function and the values for the translation vector, $(t_x, t_y)$, according to equation (3) above (step 200). The translation vector, $(t_x, t_y)$, and the angle of rotation, θ, together comprise the motion parameter for the image capture device. The motion parameter may then, for example, be transmitted to an output device (step 202) for display or use by some external system. Additionally, the motion parameter may be stored in a memory unit for future use.

After the motion parameter has been determined (step 200) based on the pair of selected image frames (e.g., image frame 10 and image frame 20), steps 156-200 may be repeated to determine a new motion parameter based on a new pair of selected image frames (e.g., image frame 20 and image frame 30). In this way, a motion parameter may be continually determined as the image capture device travels along a path of movement.

It will be understood and appreciated that one or more of the processes, sub-processes, and process steps described in connection with FIG. 1 and FIG. 6 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIG. 1. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module, which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., an egomotion estimation system 100 in FIG. 1), direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electro-chemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A computer-implemented method for determining an egomotion parameter using an egomotion estimation system comprising:
   obtaining a first image frame and a second image frame;
   selecting a first portion of the first image frame to obtain a first sub-image that is formed from the first image frame, and selecting a second portion of the second image frame to obtain a second sub-image that is formed from the second image frame;
   performing a transformation on the first sub-image and the second sub-image to respectively obtain a first perspective image and a second perspective image;
   iteratively adjusting the second perspective image to obtain a plurality of adjusted perspective images;
   determining a plurality of difference values respectively corresponding to a respective difference between the first perspective image and the plurality of adjusted perspective images; and
   determining a translation vector for an egomotion parameter, wherein the translation vector corresponds to one of the difference values in the plurality of difference values.

2. The computer-implemented method of claim 1 further comprising determining an angle of rotation for the egomotion parameter using the translation vector.

3. The computer-implemented method of claim 1 where the first perspective image and the plurality of adjusted perspective images respectively comprise a plurality of pixels, each pixel having a corresponding pixel value, and further comprising:
   summing an absolute difference between corresponding pixel values in the first perspective image and the plurality of adjusted perspective images to respectively determine the plurality of difference values.

4. The computer-implemented method of claim 1 where the translation vector includes a horizontal component and a vertical component and further comprising:
   performing a first iteration to obtain a first plurality of difference values and performing a second iteration to obtain a second plurality of difference values;
   determining a horizontal translation value that corresponds to one of the difference values in the first plurality of difference values and determining a vertical translation value that corresponds to one of the difference values in the second plurality of difference values; and
   identifying the horizontal translation value as the horizontal component of the translation vector and identifying the vertical translation value as the vertical component of the translation vector.

5. The computer-implemented method of claim 4 where the first iteration and the second iteration are performed in parallel.

6. The computer-implemented method of claim 4 where:
   the first iteration is performed over a first interval that is based on a maximum horizontal component of a maximum translation vector; and
   the second iteration is performed over a second interval that is based on a maximum vertical component of the maximum translation vector.

7. The computer-implemented method of claim 6 further comprising determining the maximum horizontal component and the maximum vertical component of the maximum translation vector based on a predetermined maximum speed, a predetermined image frame rate, and a time interval between the first image frame and the second image frame.

8. The computer-implemented method of claim 7 further comprising determining the time interval between the first image frame and the second image frame based on the image frame rate and a predetermined image frame interval.

9. The computer-implemented method of claim 1 where the second image frame is obtained subsequent to the first image frame.

10. The computer-implemented method of claim 1 where the translation vector corresponds to a smallest difference value in the plurality of difference values.

11. The computer-implemented method of claim 1 where:
    the first image frame and the second image frame are obtained by an image capture device mounted to a vehicle; and
    the first image frame and the second image frame depict a path of movement of the vehicle.

12. A system for determining an egomotion parameter comprising:
    an image processing module that receives a first image frame and a second image frame;
    an image segmentation module that divides each of the first image frame and the second image frame into a plurality of portions, selects a first portion of the first image frame to obtain a first sub-image, and selects a second portion of the second image frame to obtain a second sub-image;
    an image transformation module that performs a respective transformation on the first sub-image and the second sub-image to respectively obtain a first perspective image and a second perspective image;
    a motion compensation module that adjusts the second perspective image to obtain an adjusted perspective image;
    an image difference module that determines a difference value corresponding to a difference between the first perspective image and the adjusted image; and
    an egomotion parameter determination module that iteratively obtains a plurality of difference values respectively corresponding to a respective difference between the first perspective image and a plurality of adjusted perspective images and determines a translation vector for an egomotion parameter, wherein the translation vector corresponds to one of the difference values in the plurality of difference values.

13. The system of claim 12 where the egomotion parameter determination module determines an angle of rotation for the egomotion parameter using the translation vector.

14. The system of claim 12 where:
    the first perspective image and the plurality of adjusted perspective images respectively comprise a plurality of pixels, each pixel having a corresponding pixel value; and
    the image difference module sums an absolute difference between corresponding pixel values in the first perspective image and the adjusted perspective image to determine the difference value.

15. The system of claim 12 where:
    the translation vector includes a horizontal component and a vertical component;
    the egomotion parameter determination module performs a first iteration to obtain a first plurality of difference values and performs a second iteration to obtain a second plurality of difference values;
    the egomotion parameter determination module determines a horizontal translation value that corresponds to one of the difference values in the first plurality of difference values and determining a vertical translation value that corresponds to one of the difference values in the second plurality of difference values; and the egomotion parameter determination module identifies the horizontal translation value as the horizontal component of the translation vector and identifies the vertical translation value as the vertical component of the translation vector.

16. The system of claim 15 where the first iteration and the second iteration are performed in parallel.

17. The system of claim 15 where:
the egomotion parameter determination module iterates over a first interval for the first iteration where the first interval is based on a maximum horizontal component of a maximum translation vector; and
the egomotion parameter determination module iterates over a second interval for the second iteration where the second interval is based on a maximum vertical component of the maximum translation vector.

18. The system of claim 17 where the maximum horizontal component and the maximum vertical component of the maximum translation vector is based on a predetermined maximum speed, a predetermined image frame rate, and a time interval between the first image frame and the second image frame.

19. The system of claim 18 where the time interval between the first image frame and the second image frame is based on the image frame rate and a predetermined image frame interval.

20. The system of claim 12 where the second image frame is subsequently obtained relative to the first image frame, and where the first portion is selected to obtain the first sub-image based on an amount of imaged road surface included in the first portion relative to other portions of the first image frame.

21. The system of claim 12 where the translation vector corresponds to a smallest difference value in the plurality of difference values.

22. The system of claim 12 where:
the image processing module is in signal communication with an image capture device mounted to a vehicle;
the image processing module receives the first image frame and the second image frame from the image capture device; and
the first image frame and the second image frame depict a path of movement of the vehicle.

* * * * *